Nov. 23, 1943.  H. FORD  2,334,917
OPPOSED-PISTON ENGINE
Filed Sept. 12, 1942  4 Sheets-Sheet 1

INVENTOR.
Henry Ford
E. C. McRae
R. C. Janis
BY
ATTORNEYS.

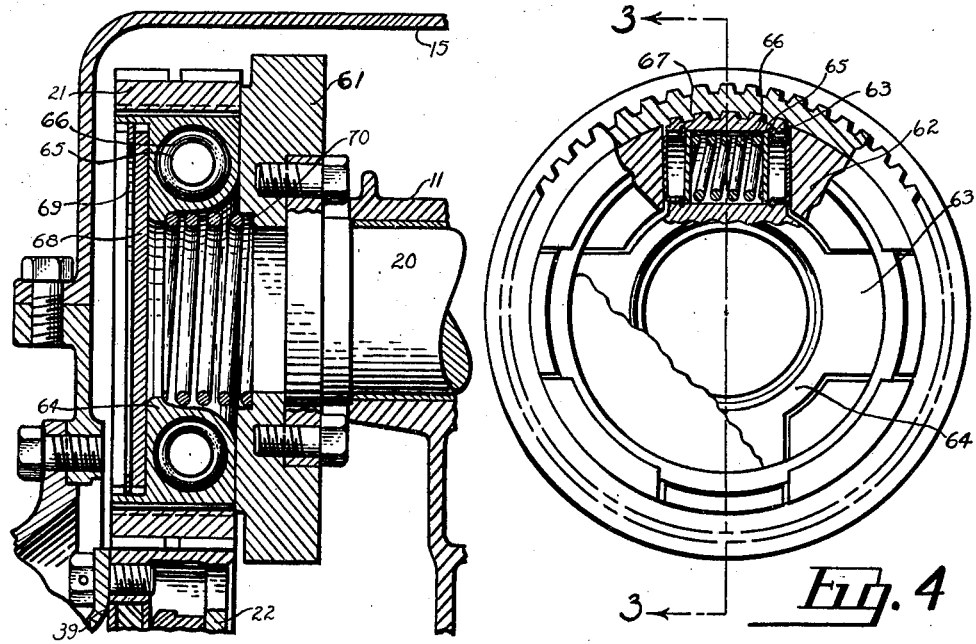
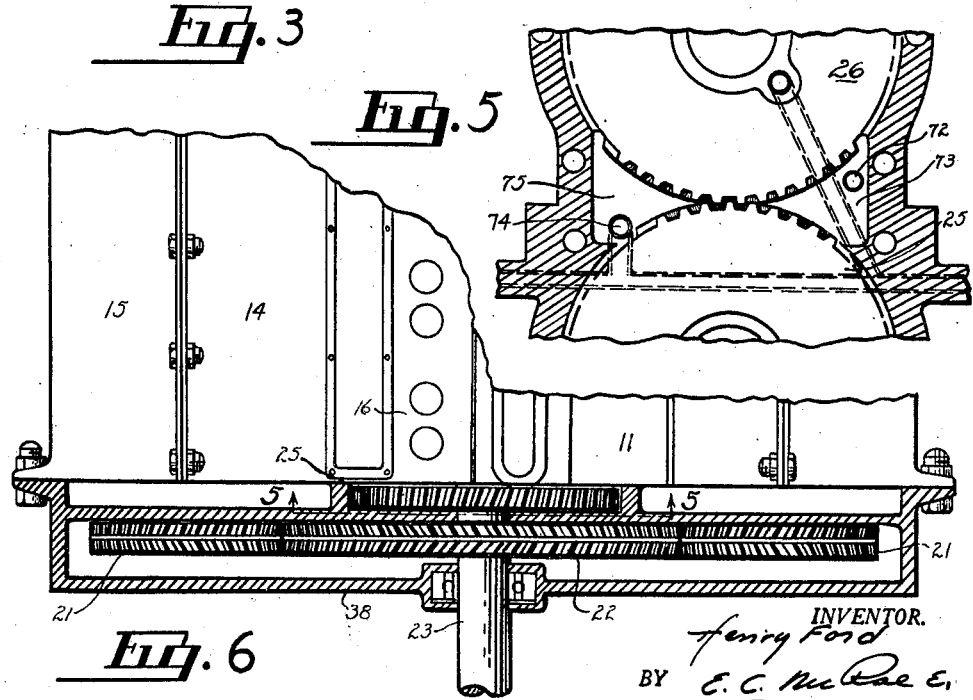

Nov. 23, 1943.  H. FORD  2,334,917
OPPOSED-PISTON ENGINE
Filed Sept. 12, 1942  4 Sheets-Sheet 3

Henry Ford
INVENTOR.

BY  E. C. McRae and
Robert T. Harris
ATTORNEYS.

Nov. 23, 1943.     H. FORD     2,334,917
OPPOSED-PISTON ENGINE
Filed Sept. 12, 1942     4 Sheets-Sheet 4

Henry Ford
INVENTOR.
BY C. C. McRae
Robt. G. Harris
Attorneys

Patented Nov. 23, 1943

2,334,917

UNITED STATES PATENT OFFICE 2,334,917

OPPOSED-PISTON ENGINE

Henry Ford, Dearborn, Mich., assignor to Ford Motor Company, Dearborn, Mich., a corporation of Delaware Application September 12, 1942, Serial No. 458,091

4 Claims. (Cl. 123—56)

This invention concerns internal-combustion engines; and, more particularly those of the dual opposed-piston type.

An object of this invention is to provide an engine having one or more cylinders with pistons in each end of each cylinder connected to spaced parallel crankshafts, the combustion chamber being defined principally by the heads of the opposed pistons in each cylinder.

A further object of this invention is to provide an improved construction for an engine of this type which insures the alignment and correct interrelation of the cylinders as well as maintaining the spacing and alignment of the crankshafts. A further improvement resides in the arrangement of the intake and exhaust valves and the provision made for their adjustment or replacement.

Yet another advantage is found in the use of a removable head as applied to this type of engine; and, as a consequence, the contemplated use of varying head contours to obtain different compression ratios. Attention, too, is directed to the power take-off and the arrangement of the engine and its accessories such as the starter, generator and distributor which provide a balanced construction.

Further advantages are to be found in the details of design which permit new economies in manufacture and maintenance and which provide a structure of increased strength without consequent increase in weight. In this respect, the engine of this invention is distinguished by an integral construction providing the requisite strength and alignment while simplifying the problem of cooling and operation. At the same time, all components requiring adjustment are readily accessible and change in the basic operating characteristics may, for the first time, be readily adjusted.

The general type of engine represented here is, of course, well known. Despite its recognized advantages which include those of compactness, lightness, a narrow frontal area which particularly suits it for certain installations, etc., the type has heretofore found little practical use. The principal reason for this neglect has been due to the difficulties encountered in the design and maintenance of this engine as compared with the more widely used conventional types. While two embodiments are shown, both employing four-cycle operation, many of the structural features are equally applicable to two-cycle engines. Similarly, though in each of the embodiments the crankshafts are shown as geared to a common drive shaft, they may as well be connected separately as in the case when the spaced shafts are used to drive separate propellers in an aircraft wing installation.

With these and other objects in view, this invention consists in the arrangement, construction and combination of the various parts of the improved device, as described in the specification, claimed in the claims and illustrated in the accompanying drawings, in which:

Figure 3 is a transverse section of the driving end of one of the crankshafts showing the resilient construction employed taken on line 3—3 of Figure 4.

Figure 4 is an elevation of the resilient drive means at the driving end of one of the crankshafts.

Figure 5 is a sectional view as indicated by line 5—5 of Figure 6 showing the oil pump.

Figure 6 is an elevation, partly in section, of the arrangement of the driving gears.

Figure 1:
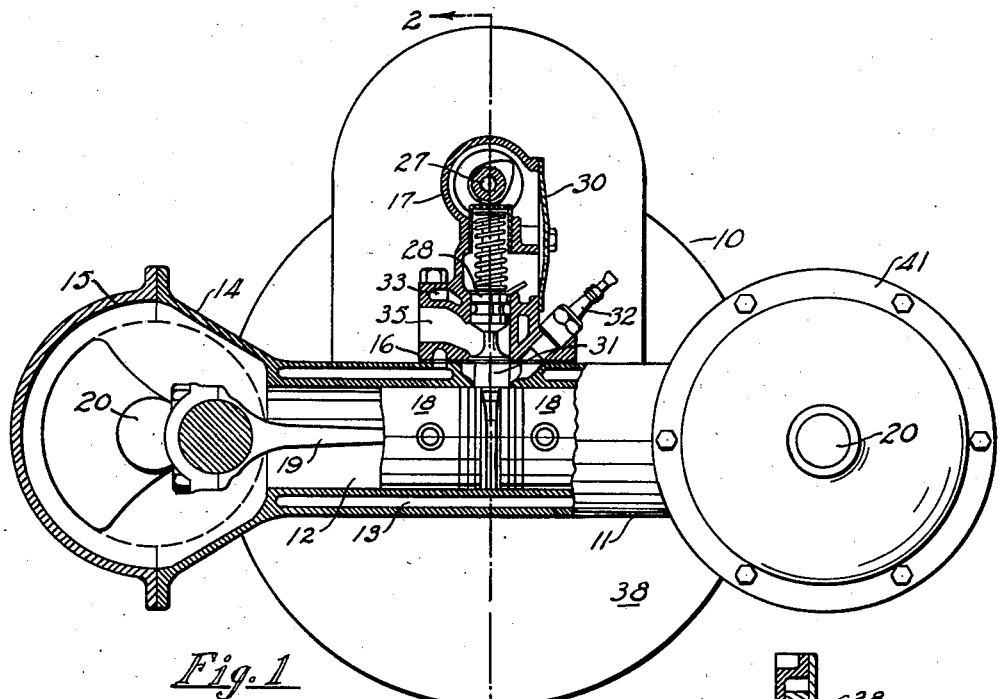
Figure 1 shows the rear end elevation of one form of the engine, a portion thereof being shown in section on a transverse vertical plane.
Figure 2:
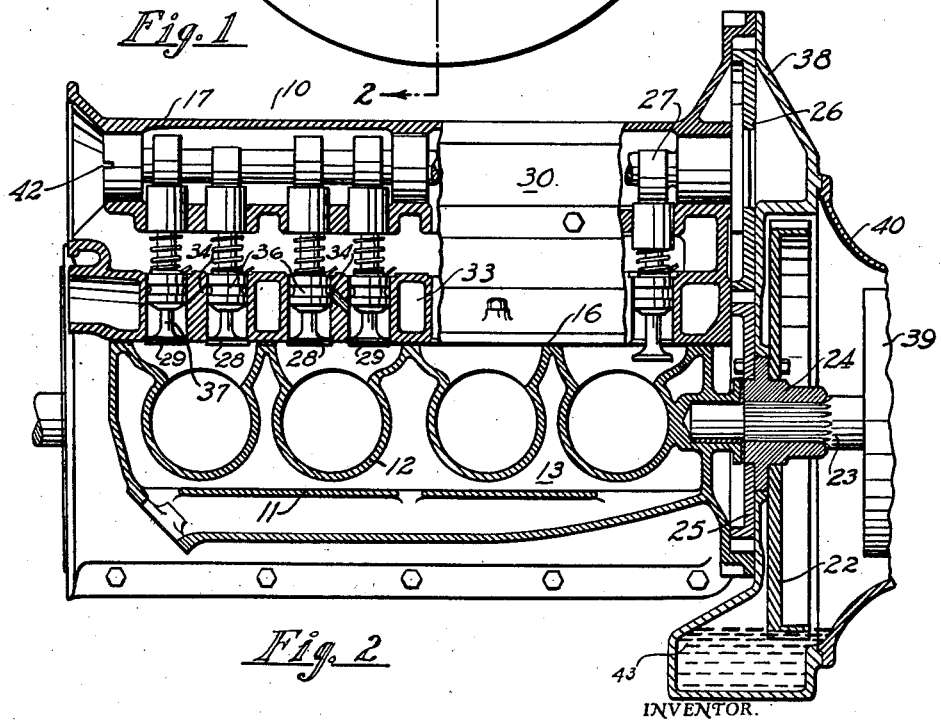
Figure 2 is a side elevation, a portion thereof being shown in section on the line 2—2 of Figure 1.

Referring now to Figures 1, 2, and 6, the first form of engine is indicated generally as 10, which includes a block 11, comprising four cylinders 12. The block 11, it will be noted, includes in one integral casting the cylinders 12, the water jacket 13, and at its outer end is flared to form the crankshaft housing 14. This housing is completed by the separable crankcase castings 15 bolted thereto. The upper side of the block 11 forms a seat 16 for the head 17 which is removably attached thereto.

A pair of opposed pistons 18, having the connecting rods 19 to the crankshaft 20, is placed in each of the cylinders 12. Herringbone pinions 21, attached to one end of each of the crankshafts 20, mesh with the drive gear 22, which is secured to the drive shaft 23 by means of a spider 24 splined to the shaft. A camshaft pinion 25 is also bolted to the spider 24 and meshes with the camshaft drive gear 26, preferably with a 2:1 speed reduction. The camshaft 27 is driven thereby and operates the intake valves 28 and exhaust valves 29 which control the intake and exhaust from the various cylinders to the usual manifolding which is not shown here. A removable plate 30 gives access to the interior of the head 17 and permits the ready adjustment and repair of the valve mechanism, camshaft, etc.

The combustion chamber 31 is defined by the opposed faces of the pistons 18 and ignition by the spark plug 32. The usual water jacketing 13 of the block 11 is in communication with the water jacket 33 of the head. Inasmuch as it is desirable to have the camshaft 27 run in oil, a means is provided preventing leakage of the oil into the cylinder in response to the manifold vacuum when the intake valve is open. This is the channel 34 which leads from each exhaust port 35, where the pressure is in excess of atmospheric, to the valve bushing 36. This is in communication with a pocket surrounding the shank of the valve 37 and the increased pressure transmitted there prevents the oil from leaking along the shank to the cylinder. The valve structure itself is shown in U. S. Patent No. 2,235,871.

The gearing described above is enclosed in the front housing 38 secured to the block 11, which includes the oil pan 43. The shaft 23 is connected to a transmission indicated generally as 39, preferably of the planetary type, which is enclosed in the transmission housing 40. The crankshafts 20 extend rearwardly of the block 11 and means are provided on each crankshaft housing 14 and crankcase casting 15 for the attachment of a generator or starter. These, preferably, are of the general type shown on pending applications Serial Nos. 383,361 and 383,360, respectively. These are attached, one to each crankshaft housing, as shown at 41 in Figure 1. The rear end of the camshaft 27 is keyed at 42 and the head 17 adjacent this is shaped to receive a direct drive distributor. As has been pointed out before, the balanced location of the generator and starter is advantageous since by equating the centrifugal effect of each under normal operating conditions, balanced flywheels are obtained without undue increase in weight and the vibrational stresses on the crankshafts minimized.

Further reduction in vibration is obtained by use of a flexible coupling between the crankshaft 20 and the pinion 21. As best shown in Figures 3 and 4, this includes a dog plate 61 secured to the end of the shaft 20 and having on its outer surface four segmental dogs 62. Interposed between these are the corresponding dogs 63 of the spider plate 64. Each of the dogs 63 has a transverse bore 65 in which is seated a spring which resiliently bears against the adjacent faces of the dogs 62 on each side of it. The pinion 21 itself is in the form of an annulus slipped over the periphery of the associated dog and spider plates and having key means 67 between it and the latter. A friction plate 68 engages the outer surface of the spider plate 64 being keyed to rotate with the dog plate 61 and retained in position axially of the shaft 20 by a retainer ring 69. The frictional engagement between friction plate 68 and spider plate 64 is obtained through axial spring 70 which urges the spider plate outwardly with respect to shaft 20. This construction obtains necessarily torsional flexibility through the interaction of springs 66 with dogs 62 which is positively limited by interaction of dogs 62 and 63. At the same time, the frictional engagement between plate 68 and spider 64 dampens the vibratory action of the meshed plates and permits particularly smooth operation between the crankshafts and the drive shaft 23.

Another feature is the provision made for oil circulation shown in Figures 2, 4, 5, and 6. As noted previously, the primary gearing consists of the pinions 21 on the crankshafts 20 meshing with the drive gear 22 on the drive shaft 23. The secondary gearing includes the camshaft pinion 25 on the drive shaft 23 meshing with the camshaft gear on the camshaft 27. This secondary gearing serves as an oil pump, there being a suction conduit 72 communicating with the suction chamber 73 and delivery conduits 74 running from the delivery chamber 75 to the camshaft and main bearings. This utilization of the timing gear permits the location of the pump at the optimum point in so far as this form of engine is concerned and further obviates the use of a separate pump and its drive.

Figure 9:
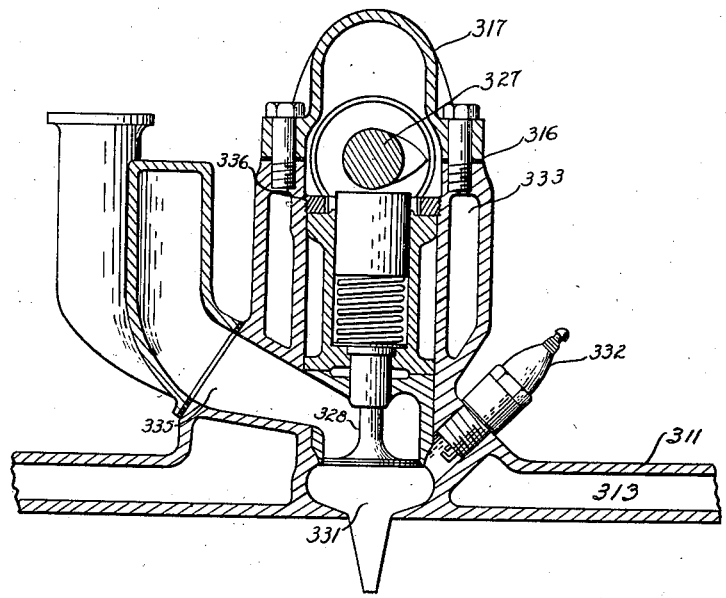
Figures 9 and 10 are transverse sections of modified head constructions adapted for use on the first form of engine.
Figure 10:
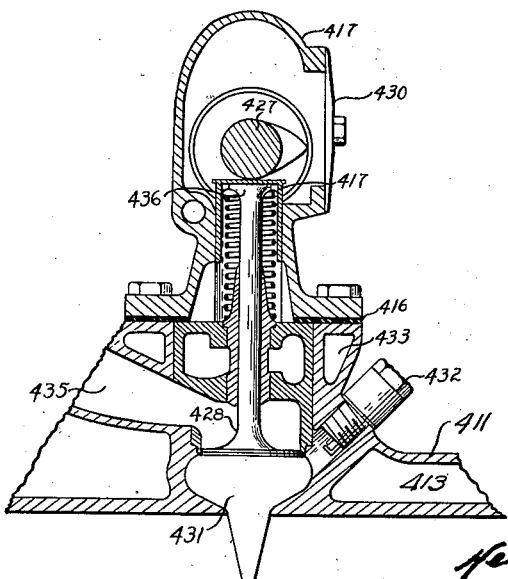

Figures 9 and 10 show two other embodiments of heads which can be applied to this type of engine and which are particularly desirable to prevent leakage between the block and head. In the interests of conciseness, co-ordinate elements of Figures 9 and 10 bear the same indicating characters as in Figure 1 except that those applicable to Figure 9 are in the 300 series and to Figure 10 are in the 400 series. Thus, the blocks 311 and 411, having water jackets 313 and 413, are shown together with the associated heads 317 and 417, matching at seats 316 and 416. However, in each case, the block structure has been extended considerably to remove the seat and its gasket from the hotter portions of the engine, permitting a better union between these two elements. Other components include the camshafts 327 and 427, the valves 328 and 428, the combustion chambers 331 and 431, the spark plugs 332 and 432, head-water jacketing 333 and 433 and the manifold connections 335 and 435.

Figure 9 shows the valve assembly 328 secured in place by a threaded retaining ring 336. Figure 10 shows a unitary valve assembly 436 held in place by the head, proper, 417; and the removable access plate 430. Each of these constructions may readily be incorporated with that shown in Figures 1 to 6, inclusive.

Figure 7:
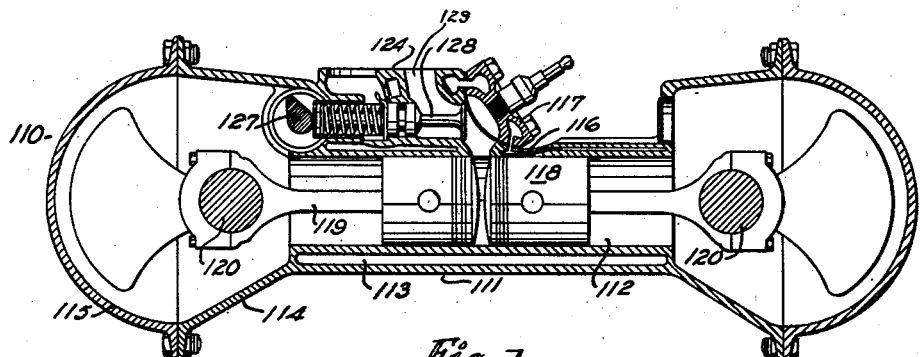
Figure 7 is a transverse vertical section through a second form of engine taken on the line 7—7 of Figure 8.
Figure 8:
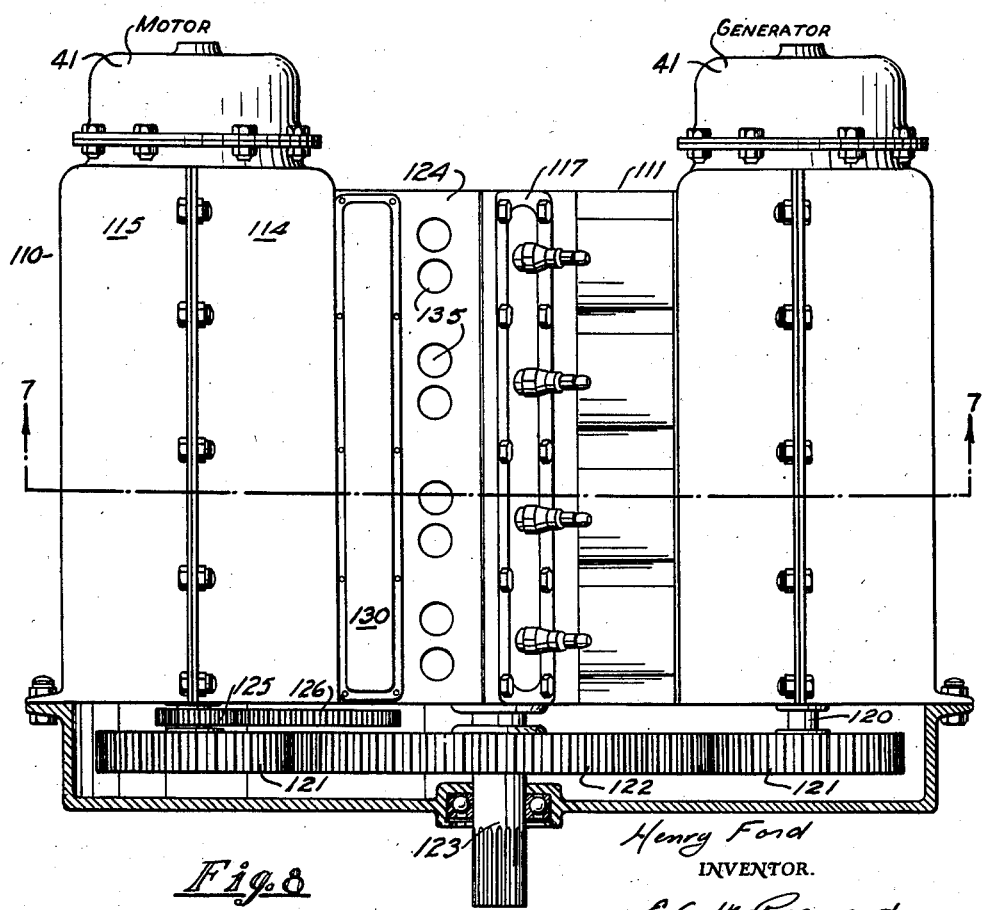
Figure 8 is a top plan view of the second form of engine.

Turning now to Figures 7 and 8, a modified form 110 of opposed-piston engine is shown. In common with the first form, it has the block 111, cylinders 112, water jacket 113, crankshaft housing 114 and crankcase 115. The pistons 118 and connecting rods 119 drive the crankshafts 120, having pinions 121 meshing with drive gear 122 which drives the shaft 123.

The construction differs from the first in that a valve housing 124 is formed integral with the block 111 and includes the camshaft 127, the valves 128 and the ports 135. The camshaft 127 is driven from one crankshaft 120 through the camshaft pinion 125 and camshaft gear 126. The head 117 is again removable but is received in a cylindrical seat 116 which extends longitudinally of the engine. The inner surface 129 of the head may be varied to obtain different compression ratios or ignition characteristics and a removable plate 130 gives access to the valves.

The cylindrical seat is used, first, because of ease of manufacture in which the entire seat may be formed either by running a milling cutter or a grinding wheel the length of the seat; and, second, because of the better seating obtained. Attention is particularly directed to the compactness resulting from this construction in that the entire valve and head structure is confined well within the outer limits of the crankshaft housing. Further, the head itself is of a very simple construction and extremely light in weight, adding little to the weight of the engine as a whole. The means for preventing oil leakage along the intake valve shank described with the first form of the engine is equally applicable here. In both cases, as the valves are disposed side by side longitudinally of the engine, the utility of this device is enhanced by the directness of the connection and the high temperature prevailing around the channels which prevent them from the clogging which occurred in previous forms. This head and valve arrangement is particularly advantageous where minimum frontal area is a requisite. It also has the advantage of extreme simplification since the head carries no moving parts whatsoever and it is only necessary in applying it that the water jacket ducts are in register.

While the first form of engine does not have the compactness of the second, in that the valve structure extends vertically and outside of the lines defined by the crankshaft housing, it is particularly adapted for use in automotive work where larger frontal area would not be a handicap and for this purpose it has the advantage of a somewhat more accessible valve structure. In addition, the valve being spaced from the engine, the problems incident to cooling and lubrication are diminished. However, it is still possible to obtain the varying compression ratio characteristics and both forms of heads possess the advantages outlined.

It is to be emphasized particularly that inasmuch as one integral casting forms the cylinder and the bearings for the two crankshafts, there can be no difficulties over alignment or spacing of the shaft or over misalignment of the cylinders, as occurs when these elements are incorporated in separate structures. Coupled with this is the convenience and accessibility which results from the particular head structure used and which is novel in an engine of this type. The difficulties heretofore encountered in comparable structures are avoided by following the construction disclosed in that a stronger structure and one more readily assembled and disassembled is obtained, while the accessibility of all parts requiring attention is actually increased. At the same time, the assembly is improved in detail as shown by the novel construction and placement of the oil pump. Furthermore, the structure is particularly designed for economical manufacture and the utilization of various tools and methods which permit closer tolerances than have been possible heretofore. The flexibility incorporated in the driving gear train contributes greatly to quieter performance. As the main drive gear 22 is readily removable from the spider 24, the phase relations of the two crankshafts may be mutually changed to obtain different conditions of dwell or compression, as a matter of permanent adjustment, by merely removing the gear, adjusting the pinions to the desired phase relation and remeshing them and the gear. As has been stated, two principal forms of engines involving the inventive concepts have been shown as well as two additional head constructions and they are equally applicable to other engines embodying different characteristics. However, in any of these embodiments, the advantages which flow from the construction may readily be realized.

Some changes may be made in the arrangement, construction and combination of the various parts of the improved device without departing from the spirit of the invention and it is the intention to cover by the claims such changes as may be reasonably included within the scope thereof.

The invention claimed is:

1. In an opposed-piston engine having a plurality of cylinders and a crankshaft at each side thereof, a removable head comprising an elongated casting adapted to be positioned on substantially the middle line of said engine, and to be in communication with each of the cylinders therein, a convex cylindrical seating surface forming the lower part of said head, and combustion chambers formed therein at spaced intervals corresponding to the spacing of said cylinders.

2. In an opposed-piston engine having a block comprising a plurality of cylinders transversely arranged and a crankcase extending longitudinally at each side thereof, a crankshaft in each said crankcase, said crankshafts extending forwardly of said block and drivingly associated with a power take-off, said crankshafts extending rearwardly of said block for driving engagement with a starter and a generator, respectively, the centrifugal effects of said starter and said generator being substantially equated under normal operating conditions to provide a balanced flywheel effect for each said crankshaft.

3. In an opposed piston engine, an integral block casting having a crankcase housing the plurality of crankshaft bearings formed at each end thereof and a plurality of cylindrical bores extending between said crankcases, a crankshaft disposed in each said crankcase housing, crankcases secured to each said crankcase housing to complete the crankshaft enclosure, a pair of opposed pistons in each said cylindrical bore, a unitary head seated on and removably secured to said block on substantially the longitudinal middle portion thereof, said head extending over and being in communication with each of said cylindrical bores, intake and exhaust valves associated with each of said cylindrical bores, power take-off associated with said crankshaft, said valves being in substantial successive alignment longitudinally of said engine, intake and exhaust valves of each said cylinder being disposed in adjacent chambers, bushings in said chamber, and a channel directly traversing the wall separating said adacent chambers, said channel entering said exhaust chamber on the exhaust port side of said bushing therein, said channel discharging into said intake chamber intermediate said bushing therein.

4. In an opposed piston engine, an integral block casting having a crankcase housing a plurality of crankshaft bearings formed at each end thereof and a plurality of cylindrical bores extending between said crankcases, a crankshaft disposed in each said crankcase housing, crankcases secured to each said crankcase housing to complete the crankshaft enclosure, a pair of opposed pistons in each said cylindrical bore, a unitary head seated on and removably secured to said block at substantially the longitudinal middle portion thereof, said head extending over and being in communication with each of said cylindrical bores, intake and exhaust valves associated with each of said cylindrical bores, power take-off means associated with said crankshaft, said valves being in substantial successive alignment longitudinally to said engine, and disposed substantially parallel with said cylindrical bores, a cylindrical seating surface formed on said block longitudinally thereof, and a co-operating seating surface provided on said head.

HENRY FORD.